US009438454B1

(12) United States Patent
Su

(10) Patent No.: US 9,438,454 B1
(45) Date of Patent: Sep. 6, 2016

(54) ALIGNMENT OF MULTIPLE EDITIONS OF A SIGNAL COLLECTED FROM MULTIPLE SENSORS

(71) Applicant: The United States of America, as represented by the Secretary of the Army, Washington, DC (US)

(72) Inventor: Wei Su, Bel Air, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 829 days.

(21) Appl. No.: 13/783,309

(22) Filed: Mar. 3, 2013

(51) Int. Cl.
*H04L 27/06* (2006.01)
*H04L 27/00* (2006.01)
*H04L 27/26* (2006.01)
*H04B 1/10* (2006.01)

(52) U.S. Cl.
CPC ............. *H04L 27/0012* (2013.01); *H04B 1/10* (2013.01); *H04L 27/2655* (2013.01)

(58) Field of Classification Search
CPC . H04L 7/042; H04L 27/2662; H04L 25/067; H04L 1/0045; H04L 27/2647; H04L 1/005; H04L 1/0054; H04L 1/20; H04B 1/7093; H04B 1/707; H04B 1/709; H04B 1/30; H04B 1/28; H04N 5/4401

USPC .................. 375/343, 340, 316, 295, 219
See application file for complete search history.

(56) References Cited

U.S. PATENT DOCUMENTS 6,201,499 B1 * 3/2001 Hawkes ................. G01S 1/045
342/387
2015/0312663 A1 * 10/2015 Traa .................... G10L 21/0308
381/92

* cited by examiner

*Primary Examiner* — Zewdu Kassa
(74) *Attorney, Agent, or Firm* — Azza Jayaprakash

(57) ABSTRACT

Various embodiments associated with synchronization of signal editions from multiple sensors are described. A plurality of sensors can be deployed in an environment. Different copies of a desired signal can be present in the environment and there can be a desire to identify this signal even if the signal is unknown (and a demodulation scheme of the desired signal is not known). The plurality of sensors can sense weak editions of the desired signal and transfer those signals to a master sensor or to a separate location, such as a fusion center. The weak editions may be asynchronous due to the editions being captured at different locations, different channels, different devices, etc. At the master sensor or separate location, the weak editions can be post-synchronized together and then fused together into a strong signal. From the strong signal, a demodulation scheme can be determined and the signal can be demodulated.

20 Claims, 19 Drawing Sheets

ALIGNMENT OF MULTIPLE EDITIONS OF A SIGNAL COLLECTED FROM MULTIPLE SENSORS

GOVERNMENT INTEREST

The innovation described herein may be manufactured, used, imported, sold, and licensed by or for the Government of the United States of America without the payment of any royalty thereon or therefor.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system is described comprising a processor and a non-transitory computer-readable medium is described. The non-transitory computer-readable medium is communicatively coupled to the processor and stores components executable by the processor to facilitate operation of components. The components comprise a find component configured to find an alignment point between a first signal edition of a signal and a second signal edition of the signal. The components also comprise an alignment component configured to use the alignment point to align the first signal edition and the second signal edition, where the alignment point is a point of greatest alignment between the first signal edition and the second signal edition. The first signal edition is different from the second signal edition, a first sensor collects the first signal edition, a second sensor collects the second signal edition, and the first sensor and second sensor are different sensors.

A method is described comprising executing instructions from a non-transitory computer readable medium. The instructions comprise aligning a first signal edition of a signal with a second signal edition of the signal, where the first signal edition is different from the second signal edition, where a first sensor collects the first signal edition, where a second sensor collects the second signal edition, where the first sensor and second sensor are different sensors. The instructions also comprise making a selection of a demodulation scheme for the signal, where the selection is based, at least in part, on mathematical analysis of the first signal edition and the second signal edition when aligned.

A non-transitory computer-readable medium is described that is configured to store computer-executable instructions that when executed by a processor, cause the processor to perform a method. The method comprises collecting a first signal edition of a signal from a first sensor and collecting a second signal edition of the signal from a second sensor, where the first signal edition and the second signal edition are not synchronized with one another and where the first sensor and the second sensor are part of different networks. The method also comprises synchronizing the first signal edition with the second signal edition along with identifying a constellation of the signal through use of the first signal edition and the second signal edition. The method further comprises matching the constellation of the signal with a constellation of a known signal and establishing a modulation scheme associated with the known signal. In addition, the method comprises using the modulation scheme associated with the known signal to demodulate the signal and causing the signal to be outputted after being demodulated.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
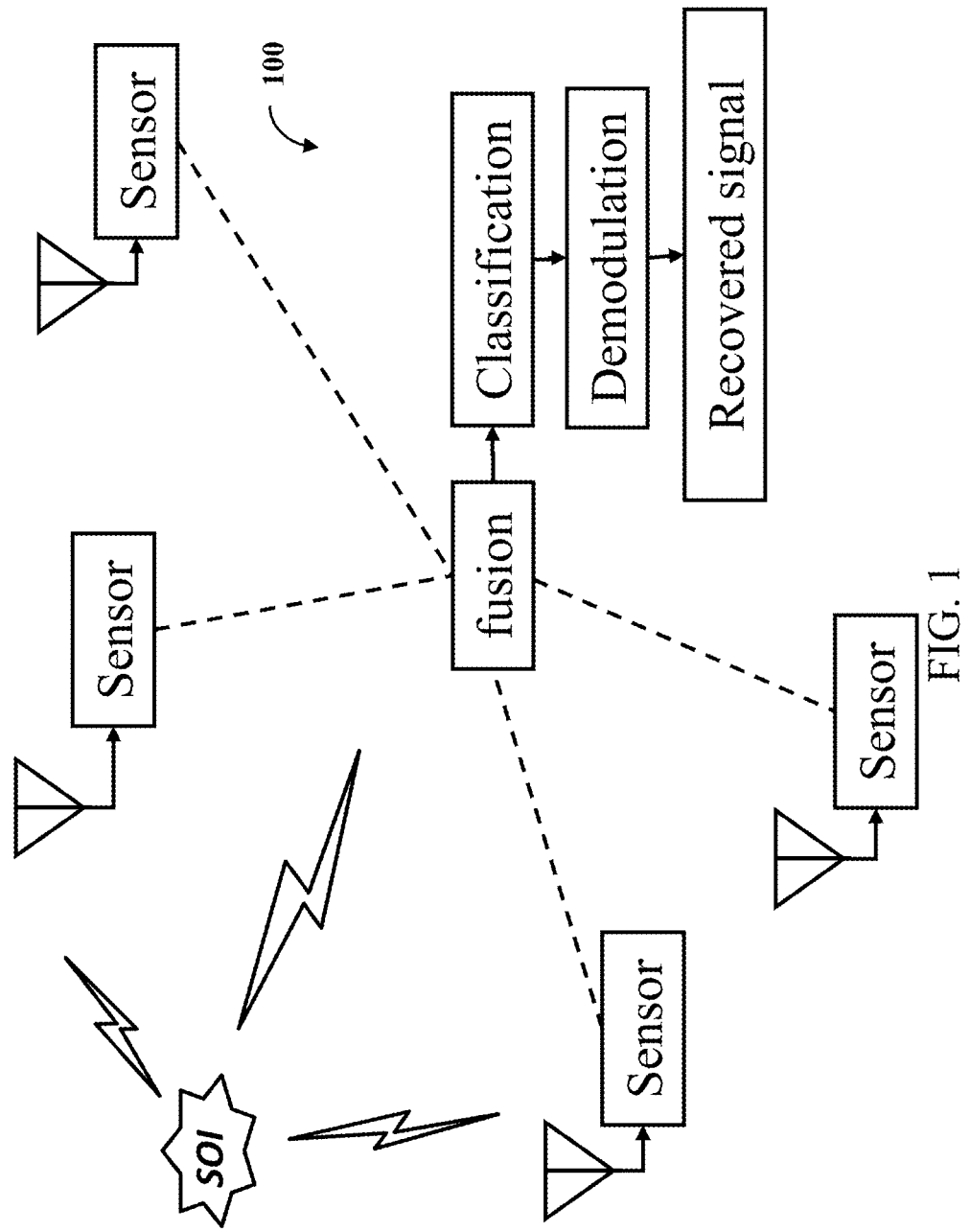
FIG. 1 illustrates one embodiment of a system with various sensors, a fusion module, a classification module, a demodulation module, and a recovered signal.

Asynchronous low-cost sensors can be used in distributed locations for sensing and classifying weak wireless signals. This weak signal may not be identifiable by using a single sensor alone, but can be detected and classified by fusing multiple weak signals (e.g., editions or editions of the weak signal) collected by individual sensors. The asynchronous signal copies can have unwanted offsets in time, frequency, and phase due to the diversities in local oscillators and unknown communication channels. A post-synchronization method can be employed to estimate and compensate for offsets without adjusting sensor parameters. Synchronized signals can be used together to form a combined signal and the combined signal can achieve a higher processing gain for reliable signal exploitation.

With rapid growth of wireless communication services and high performance electronic devices, wireless communications can benefit from more intensive and efficient use of spectrum and higher data rates. Dynamic spectrum access, adaptive modulation, low-power transmission, and sensor networks can have desired capabilities of cognitive radios which can freely hop through available spectrum and nodes, modify transmission characteristics and waveforms, and exploit opportunities of using the spectrum and power effectively. There can be a desire to sense an agile signal of interest (SOI) in a dynamic environment with unpredictable adaptations and low transmitting power. Spectrum sensing and classification conventionally are limited to using a single sensor/receiver with sophisticated signal processing. The performance of such techniques can be significantly degraded by the location, channel quality, and signal strength of the receiving sensor. In a non-cooperative communication environment (e.g., no handshaking between transmitters and receivers), a transmitting signal and communication channels are usually not favorable to an ad-hoc receiver or sensing unit and the received signal at the sensor could be weak and distorted so that signal sensing and classification becomes extremely difficult and unreliable. To address the sensing and classification bottleneck, a sensor network can be employed. A network centric framework could include interfaces for connecting distributed devices as well as functionality used to search for unknown dimensions for new capabilities. Fusion of local signal decisions and a central decision of the fused signals can be employed. The former uses expensive distributed processors to make decisions locally and the latter combines the multiple signal copies from less-expensive sensors to make a central decision. However, the synchronization of time, frequency, and phase among sensors in making central decisions is costly and impractical in many operations. Aspects disclosed herein can be used on a central decision of the fused signals approach by using the low-cost sensors or leveraging existing networked sensors distributed at different scales throughout everyday life without the accurate synchronization. The asynchronous signal copies can be processed in the fusion center using post-synchronization before they are combined. The copy of the optimally combined signals can give more accurate description of the SOI than any one of the individual signal copies alone.

FIG. 1 illustrates one embodiment of a system 100 with various sensors, a fusion module, a classification module, a demodulation module, and a recovered signal. Central decision based distributed signal sensing and modulation classification can be performed by the system 100. Simple, inexpensive, low-maintenance, and heterogeneous sensors can be used such that sensing devices can be deployed to cover a wide-spread geographical area seamlessly and multiple narrow-band receivers can be collaborated to handle a wide frequency band effectively. The distributed sensors (e.g., dumb sensors) can be clustered and orchestrated by a fusion center (e.g., smart fusion center) with sufficient processing power. Two example options that can be employed include: (i) deploying massive amounts of very low-cost and disposable sensors to cover remote, inaccessible, hostile and dangerous regions, and (ii) leveraging existing infrastructure such as heterogeneous conventional or cognitive radios, Wi-Fi devices, phones, or mesh networks by contributing limited or partial operation for signal sensing (as a secondary function) under a service agreement without affecting their primary function. The latter is also considered to be an inexpensive and low-maintenance case since the assets are shared which are already established, managed and maintained by primary users. Under a framework of dumb sensors, interfaces of the sensors can be pushed towards the antennas. The burden of the extra signal processing can be absorbed by the fusion center (shown in FIG. 1 as 'fusion') and the sensors merely relay the raw data (hence the dumb sensors and smart fusion center). Operational decisions can be made and executed at the fusion center, which avoids the requirements for demodulating signals at distributed locations and simplifies the security and operational requirements. Further, this makes the applications and future system upgrade independent to the distributed sensors. Each of these two options does not contradict the other and they can be used in the same platform or application, as well as along with other options.

The fusion center may be located at the same location as a sensor or elsewhere. The fusion center sends periodic requests to L distributed sensors, $R_1, R_2, \ldots,$ and $R_L$ to acquire the weak SOI. Upon the reception of the request, the distributed sensors take short time duration snapshots of the SOI. The distributed sensors may provide very limited signal processing capabilities such as RF reception and transmission, frequency tuning and down-conversion, filtering, and digitization to the different editions. Thus, the sensors are asynchronous and non-cooperative to one another and are used merely for communicating with, or relaying distributed snapshots to, the fusion center. The snapshots are very short and are taken periodically. Therefore, there is ample time between two snapshots for signal processing and analysis. This capture and processing is conducted in real-time.

In an asynchronous sensor scenario, magnitudes, phases, frequencies, and sampling clocks among sensors can be different. Consequently, the fusion center estimates the relative phase offset (RPO) induced by different local oscillators (LOs), channels and filters, relative time offset (RTO) induced by different propagation paths and sampling clocks, the relative frequency offset (RFO) induced by different LOs and the Doppler effect, and relative sampling frequency offset (RSO) caused by the drift and diversity of the sampling clocks before combining the signal copies coherently. The fusion center can be designed to have adequate signal processing power and time to estimate, analyze, and process the data delivered by the sensors to generate an enhanced signal for detection, classification and blind demodulation.

In one dumb sensor scenario embodiment, the sensors do not make local decisions but relay the snapshots, $r_i(t)$, $i=1, 2, \ldots, L$, to the fusion center, or store the short time-stamped digital data packets and forward them to the fusion center for processing. The packets can be transmitted to the fusion center using a communication method. Without loss of generality, $R_1$ is assumed to be the reference sensor, and $R_2, R_3, \ldots,$ and $R_L$ are compared to $R_1$ for calculating offsets. Assuming offsets have no noticeable change within a very short collection time period and as such, calculations discussed herein are under this assumption. The signal packets received at the fusion center can be described as:

$$r_i(t) = \Delta\alpha_i e^{j(\Delta\omega_i t + \Delta\beta_i)} s(t + \Delta\tau_i) + n_i(t) \tag{1}$$

where $i=2, 3, \ldots, L$; $\Delta\omega_i$, $\Delta\beta_i$, and $\Delta\tau_i$ are RFO, RPO, and RTO, respectively, and $\Delta\alpha_i$ is the relative magnitude offset (RMO), which does not need to be known in the post-synchronization. Relative offsets are referring to:

$$r_i(t) = \Delta \alpha_i e^{j(\Delta \omega_i t + \Delta \beta_i)} s(t + \Delta \tau_i)) + n_i(t) \quad (2)$$

where $s(t) = a_0 s_0(t) e^{j(\omega_0 t + \beta_0)}$ is the frequency down-converted copy of the SOI observed at $R_1$, $s_0(t)$ is a sequence of pulse shaped information symbols, $a_0$, $\omega_0$, and $\beta_0$ are gain, frequency, and phase offsets between the transmitter and $R_1$, respectively, and $n_i \sim N(0, \sigma_i)$, $i = 1, 2, \ldots, L$ is i.i.d. circularly symmetric complex additive white Gaussian noise (AWGN). If $\Delta \omega_i$ and $\Delta \tau_i$ can be estimated and eliminated, the signals can be combined to form:

$$r^c(t) = \bar{\alpha} s(t) + \bar{n}(t) \approx \bar{\alpha} s(t)$$

where $$\bar{a} = \sum_{i=1}^{L} \Delta \alpha_i e^{j \Delta \beta_i} \text{ and } \bar{n}(t) = \sum_{i=1}^{L} n_i(t).$$

If signals have equal gains and noises have equal variances, the SNR of the combined signal is L times the SNR of a single signal when $\Delta \beta_i = 0$. However, under the assumption of using simple sensors, the offsets among sensors may not be able to be estimated locally and the sensors in the network may not be synchronous. Using a post-synchronization method can include collection asynchronous signal copies first and compensates for them later in the fusion center.

Figure 2:
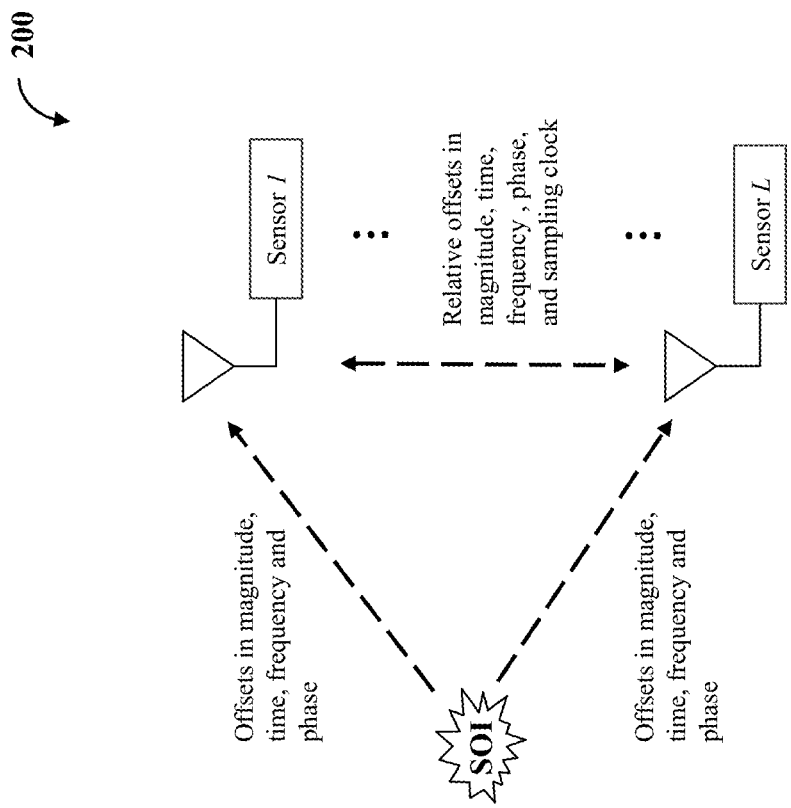
FIG. 2 illustrates one embodiment of a system with sensors.
Figure 3:
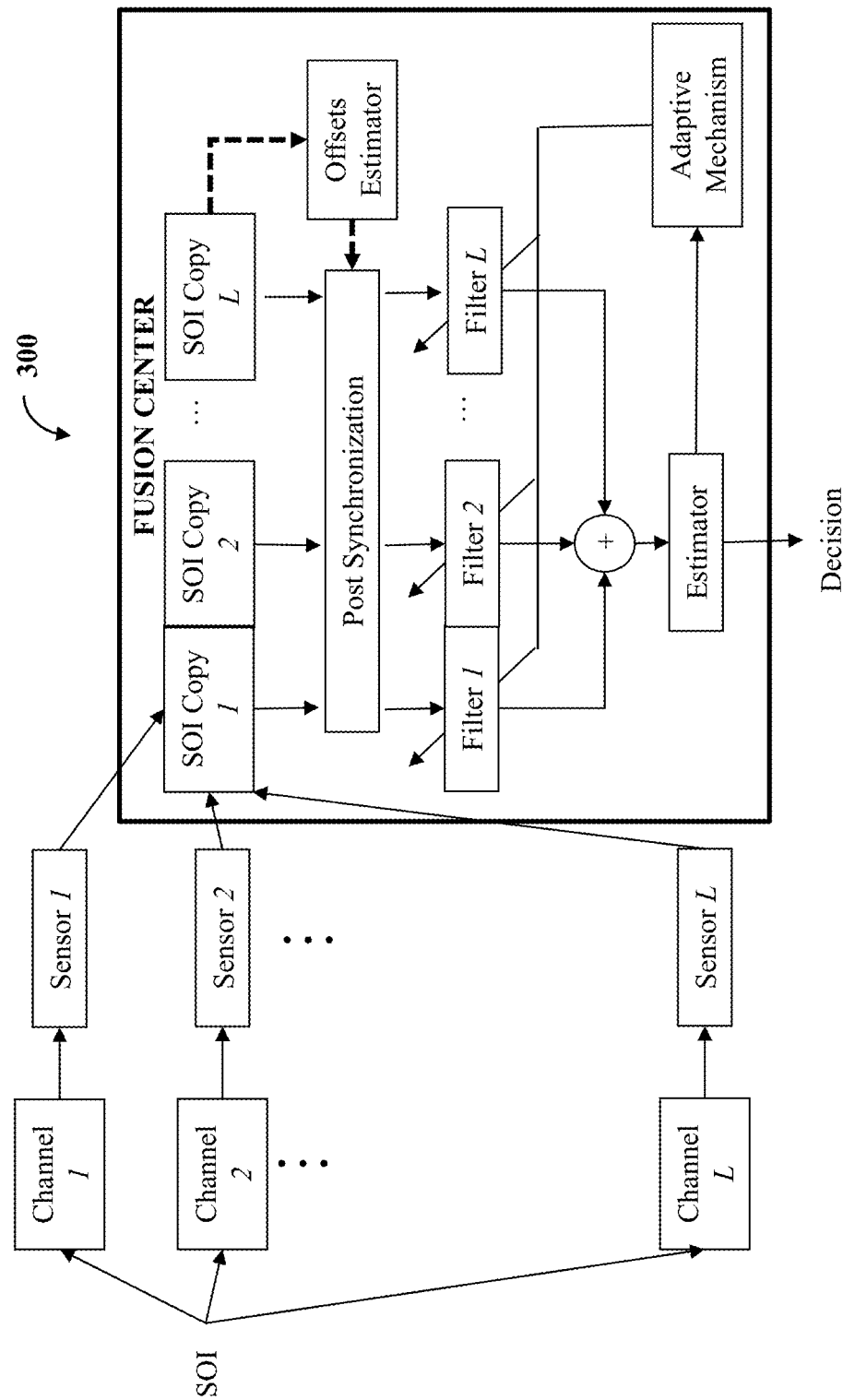
FIG. 3 illustrates one embodiment of a system with sensors and a fusion center.

FIG. 2 illustrates one embodiment of a system 200 with sensors while FIG. 3 illustrates one embodiment of a system 300 with sensors and a fusion center. Two categories of offsets in the network are the magnitude, time, frequency and phase offsets between the transmitter and receiving sensors and the relative offsets among distributed sensors as shown in FIG. 2. The goal of post-synchronization is to compensate for the RTO, RFO, RPO, and RSO so that the distributed signal copies can be combined constructively without adjusting the parameters of the networked sensors or broadcasting reference signals. The post-synchronization can comprise several actions such as clustering, as well as coarse and fine offset estimations. The clustering action sorts the signal copies and excludes the unreliable ones based on the signal power strength, channel conditions, and transmitter locations to form an optimized sensor cluster. The coarse offset estimation reduces the offset searching to a smaller searching domain, and the fine estimation conducts the final tuning to polish the offset estimation and optimize the compensation results. With time-varying channels, an adaptive mechanism may be used to compensate for the parameter variations. Finally, the distributed signal copies are combined to yield a centralized decision as illustrated in FIG. 3. In one embodiment, the post synchronization functionality and offset estimator functionality can function as part of one component.

Defining $$q_i(\Delta a_i, \Delta \beta_i, \Delta \omega_i, \Delta \tau_i, t) = r_1^*(t) r_i(t) = \Delta a_i e^{j(\Delta \omega_i t + \Delta \beta_i)} s(t + \Delta \tau_i) + v_i(t), \quad (3)$$

where * denotes the complex conjugate, j is the imaginary unit, and $v_i(t)$ includes all the uncorrelated terms, the correlation function over the observation time period $T_0 \gg \Delta \tau_i$ is $$\chi(\Delta a_i, \Delta \beta_i, \chi_1) = \quad (4)$$

$$\int_{t \in T_0} q_i(\Delta a_i, \Delta \beta_i, \Delta \omega_i, \Delta \tau_i, t) dt \approx \Delta a_i e^{j \Delta \beta_i} \chi_1(\Delta \omega_i, \Delta \tau_i).$$

where $\Delta a_i e^{j \Delta \beta_i}$ is a complex number representing the linear offsets, and $$\chi_1(\Delta \omega_i, \Delta \tau_i) = \int_{t \in T_0} e^{j \Delta \omega_i t} s_1^*(t) s_i(t + \Delta \tau_i) dt \quad (5)$$

is a function for nonlinear offsets with a maximum magnitude of $$\chi_1(0, 0) = \int_{t \in T_0} s^*(t) s(t) dt \quad (6)$$

Equation (5) can be used for detecting cyclostationarity and Doppler shift, where $\Delta \omega_i$ and $\Delta \tau_i$ are estimated by maximizing $|\chi_1(\Delta \omega_i, \Delta \tau_i)|$. $\Delta \beta_i$ can be calculated by calculating the phase of $\Psi(\Delta \alpha_i, \Delta \beta_1, \chi_1(0,0))$.

The corresponding frequency domain correlation can be obtained by using the Fourier transfer of $r_i$ and $r_1$ as below:

$$R_i(\omega) = \Delta \alpha_i e^{j(\Delta \tau_i \omega + \Delta \beta_i)} S_i(\omega + \Delta \omega_i) + N_i(\omega), \quad i = 2, 3, \ldots, L,$$

and $$R_1(\omega) = S(\omega) + N_1(\omega), \quad (7)$$

where $R_i(\omega)$, $R_1(\omega)$, $S(\omega)$, $N_i(\omega)$, and $N_1(\omega)$ are the Fourier transform of $r_i(t)$, $r_1(t)$, $s(t)$, $n_i(t)$, and $n_1(t)$, respectively. Defining $$Q_i(\Delta a_i, \Delta \beta_i, \Delta \omega_i, \Delta \tau_i, \omega) = R_1^*(\omega) R_i(\omega) = \Delta a_i e^{j(\Delta \tau_i \omega + \Delta \beta_i)} S^*(\omega) S(\omega + \Delta \omega_i) + V_i(\omega) \quad (8)$$

where $V_i(\omega)$ is the uncorrelated terms. The frequency correlation over the observation frequency domain $W_0 \gg \Delta \omega_i$ is $$\Omega(\Delta a_i, \Delta \beta_i, \Omega_1) = \quad (9)$$

$$\int_{\omega \in W_0} Q_i(\Delta a_i, \Delta \beta_i, \Delta \omega_i, \Delta \tau_i, \omega) d\omega \approx \Delta a_i e^{j \Delta \beta_i} \Omega_1(\Delta \omega_i, \Delta \tau_i)$$

where $$\Omega_1(\Delta \omega_i, \Delta \tau_i) = \int_{\omega \in W_0} e^{j \Delta \tau_i \omega} S^*(\omega) S(\omega + \Delta \omega_i) d\omega \quad (10)$$

is used for estimating the nonlinear offsets $\Delta \omega_i$ and $\Delta \tau_i$ with a maximum magnitude of $$\Omega_1(0, 0) = \int_{\omega \in W_0} S^*(\omega) S(\omega) d(\omega) \quad (11)$$

Two-dimensional searching of $\Delta \omega_i$ and $\Delta \tau_i$ for $i = 2, 3, \ldots, L$ can a tedious and computationally-intensive process. Therefore, a one-dimensional search method can be used for estimating RFO and RTO. The RTO can be estimated by finding an estimate (e.g., best estimate) $\Delta\hat{\tau}_i$ such that $$\rho(\Delta a_i, \Delta\hat{\tau}_i) = \int_{t\in T_0} \|r_i(t)\| \|r_i(t - \Delta\hat{\tau}_i)\| dt \approx \Delta a_i \rho_1(\Delta\tau_i) \quad (12)$$

is maximized. Where, $$\rho_1(\Delta\hat{\tau}_i) = \int_{t\in T_0} \|s(t)\| \|s(t + \Delta\tau_i - \Delta\hat{\tau}_i)\| dt \quad (13)$$

Using the estimated RTO to compensate for $\Delta\tau_i$ in (4) and (9), these two-dimensional searching equations are reduced to the one-dimensional search of RFO as shown below:

$$|\chi(\Delta\omega_i)| = \Delta a_i \left| \int_{t\in T_0} e^{j\Delta\omega t} s_1^*(t) s_i(t) dt \right| \quad (14)$$

$$|\Omega(\Delta\omega_i)| = \Delta a_i \left| \int_{\omega\in W_0} S^*(\omega) S(\omega + \Delta\omega_i) d\omega \right| \quad (15)$$

Thus, either (12) and (14) or (12) and (15) can be used for estimating RTO and RFO.

Furthermore, RFO can be expressed using $$\varphi(\Delta\beta_i, \Delta\omega_i, t) = \angle [r_1^*(t) r_i(t)] \quad (16)$$

with a noiseless form of $$\varphi(\Delta\beta_i, \Delta\omega_i, t) = \Delta\beta_i + \Delta\omega_i t \quad (17)$$

The slope (RFO) and the intercept (RPO) are described by a linear regression equation. RFO can also be discussed by the average, E, of phase differences, that is $$\Delta\hat{\omega}_i = E\left( \frac{d\,\varphi_i(\Delta\beta_i, \Delta\omega_i, t)}{dt} \right) \quad (18)$$

Unlike $\chi$, $\rho$ does not suppress the additive noises. However, it provides a faster and effective one-dimensional search for RTO and the parallel processing can be used for correlating multiple signal copies.

After estimation, the correlation in (5) can be compensated to have $$\chi_1(\varepsilon_i, \delta_i) \int_{t\in T_0} e^{j\varepsilon_i t} s^*(t) s(t + \delta_i) dt \quad (19)$$

where $\beta_i = \Delta\omega_i - \Delta\hat{\omega}_i$, and $\delta_i = \Delta\tau_i - \Delta\hat{\tau}_i$ are residual RFO and RTO, respectively. Residuals can be negligible in many applications. If the further correction of RFO and RTO is desired, improvement (e.g., optimization) can be conducted by fine tuning $\beta_i$ and $\delta_i$ in the vicinity (a smaller searching area) of the optimal estimates to obtain $\Delta\tilde{\omega}_i$ and $\Delta\tilde{\tau}_i$. $\Delta\tilde{\beta}_i$ can be calculated using the phase of $\chi$ in (4) after estimating RFO and RTO. Note that (i) the RMO may not affect the post-synchronization result and (ii) a small RPO may not significantly complicate the signal processing. It can be shown that if sensors have equal signal power and noise variance, and RPOs are uniformly distributed in a domain less than $2\pi$, the combined signal with existing RPOs has a higher SNR compared to a single signal if L is sufficiently large. Further, (iii) the smaller the RPO, the higher the SNR of the combined signal, (iv) the post-synchronization largely depends on the estimation of the nonlinear offsets: RTOs and RFOs, and (v) $r_1(0$ and $r_i(t)$ are correlated but $n_1(t)$ and $n_i(t)$ do not provide the noise insensitive estimation.

The equivalent one-dimensional faster search for RFO can be obtained by modifying (9) to have $$\upsilon_1(\Delta\hat{\omega}_i) \approx \int_{\omega\in W_0} \|S(\omega)\| \|S(\omega + \Delta\omega_i - \Delta\hat{\omega}_i)\| dt \quad (20)$$

and RTO can be obtained by compensating $\Delta\omega_i$ in either (4) or (9) using the estimated RFO such that $$|\chi(\Delta\tau_i)| = \Delta a_i \left| \int_{t\in T_0} s_1^*(t) s_i(t + \Delta\tau_i) dt \right| \quad (21)$$

and $$|\Omega(\Delta\tau_i)| = \Delta a_i \left| \int_{\omega\in W_0} e^{j\Delta\tau_i \omega} S^*(\omega) S(\omega) d\omega \right| \quad (22)$$

become the one-dimensional search.

If the signal copies are sampled by a common or synchronized clock, RSO is not an issue. But if the signal copies at the distributed locations are sampled by different clocks or the sampling clocks are not synchronized, the samples of $r_i$ likely will not line up with $r_1$ and should be re-sampled with interpretation, in the fusion center, after RSO estimation.

After estimating offsets, the signal copies from L sensors are combined to $$r^c(t) = \sum_{i=1}^{L} g_i(t) \Theta \left[ r_i(t - \Delta\hat{\tau}_i) e^{-j(\Delta\hat{\omega}_i t - \Delta\hat{\omega}_i \Delta\hat{\tau}_i + \Delta\tilde{\beta}_i)} \right] \quad (23)$$

where $g_i(t)$ is an adaptive filter applied to the $i^{th}$ signal copy to compensate for the channel variation and $\Theta$ is the convolution operator. Adaptive mechanisms, as shown in FIG. 3, such as maximum ratio combining and beam forming, can be used to adjust the filter weights to maximize the SNR and minimize interference and fading.

The fusion center converts the asynchronous (single-input and multiple-output) SIMO signal to (single-input and single-output) a higher-gain SISO one, $r^c(t)$, in a form which can be further processed by applications such as automatic or blind signal classifiers. Since $r^c(t)$ has higher SNR compared to $r_i(t)$, the former achieves a more reliable classification result. $r^c(t)$ is not in general coherent to the SOI transmitter since it adopts the non-coherency from the distributed sensors. In other words, there are unknown magnitude, timing, carrier frequency and phase offsets between the SOI and $r^c(t)$ although RTO, RFO, and RPO are eliminated after fusion. The non-coherence between the unknown transmitter and the combined signal is not an obstacle to signal sensing and modulation classification, since the practical automatic modulation classifier has been designed to address the offset problem for SISO RF/IF signals.

Distributed signal exploitation benefits many research areas and applications, such as RF power detection, emitter geolocation and identification, spectrum survey and monitoring, etc. Proactive (e.g., automatic) modulation classification (AMC) is an example which has applications in both military and commercial systems. AMC is a tool to identify the modulation scheme of a transmitted signal with a high probability of success within a short observation time period. In general, the software operates with wideband signal sensing or detection hardware. The signal sensing equipment scans the specified wideband for an SOI defined by certain criteria such as carrier frequency, spectrum power, preamble, bandwidth, etc. The fusion of multiple asynchronous signal copies provides a higher probability of successful signal detection and classification.

Modulation classification can start with the band-limited, digitized, and unknown IF signal intercepted by the sensing unit as an input and ends with an estimated modulation scheme as an output. It can be described as a statistical process for estimating the modulation scheme of an unknown signal based on multiple matching templates or hypotheses. Confidence measurements are used to rate the estimation results and control the quality of the modulation classification decision. With high-confidence estimation, the decision of the modulation scheme can be reported as "success", and with low-confidence estimation, the decision of the modulation scheme can be reported as "unknown."

For modern communication waveforms, extra processing may be appropriate between spectrum power sensing and modulation classification by identifying antenna dimension and coding, extracting downlink/uplink bursts, separating multiple users, removing unwanted headers and the cyclic-prefix, etc. After signal sensing and modulation classification, the resulting decision is used for post-processing with further signal analysis or message decoding.

The fused signal $r^c(t)$ can be an input to the automatic modulation classifier for signal sensing and classification. Depending on the application, the recognized outcome may be used to activate a demodulation unit, a specific modem in the universal demodulation library, with the classified signal modulation parameters and the appropriate modulation scheme for signal demodulation.

Figure 4:
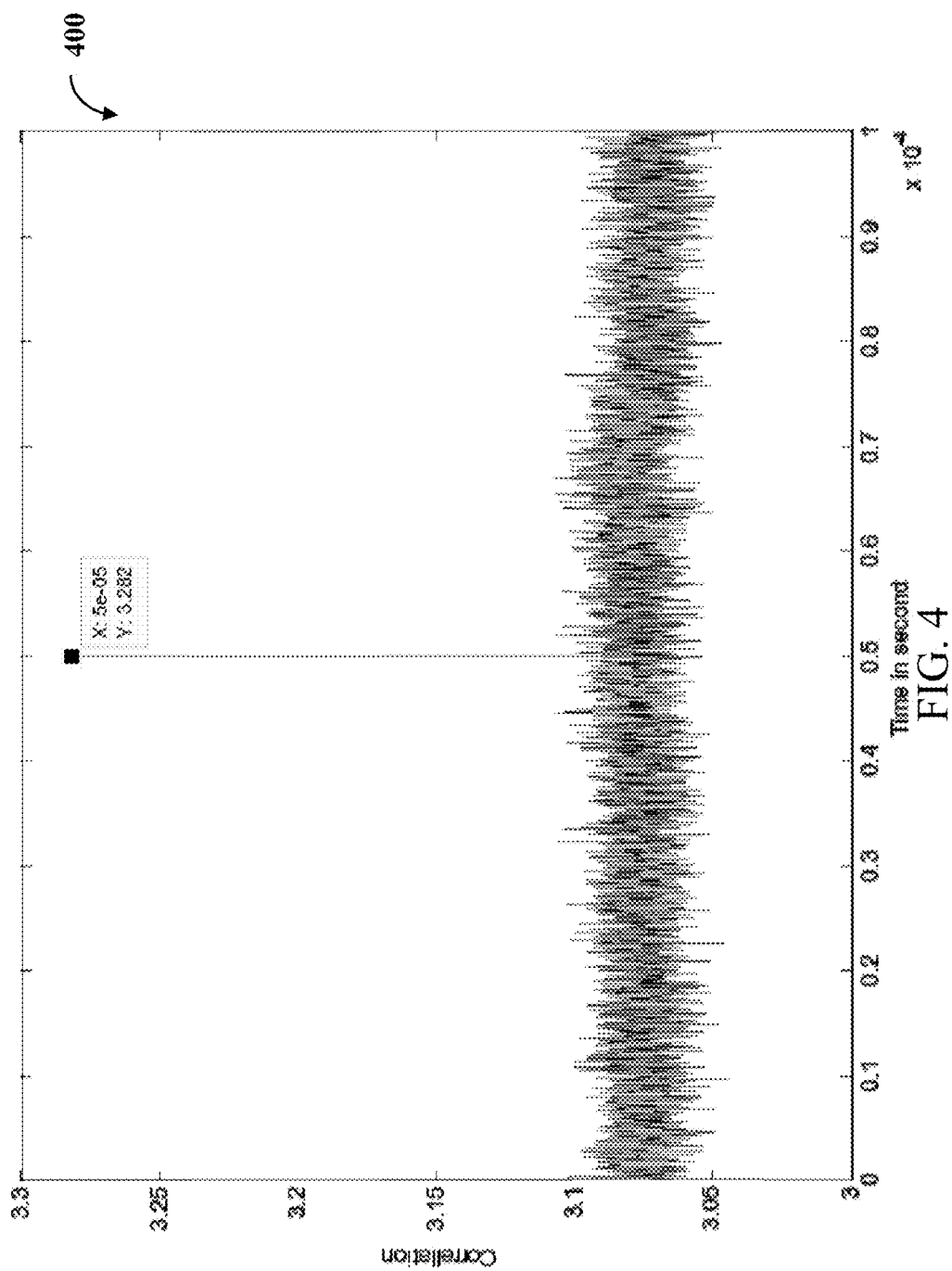
FIG. 4 illustrates one embodiment of a graph.
Figure 5:
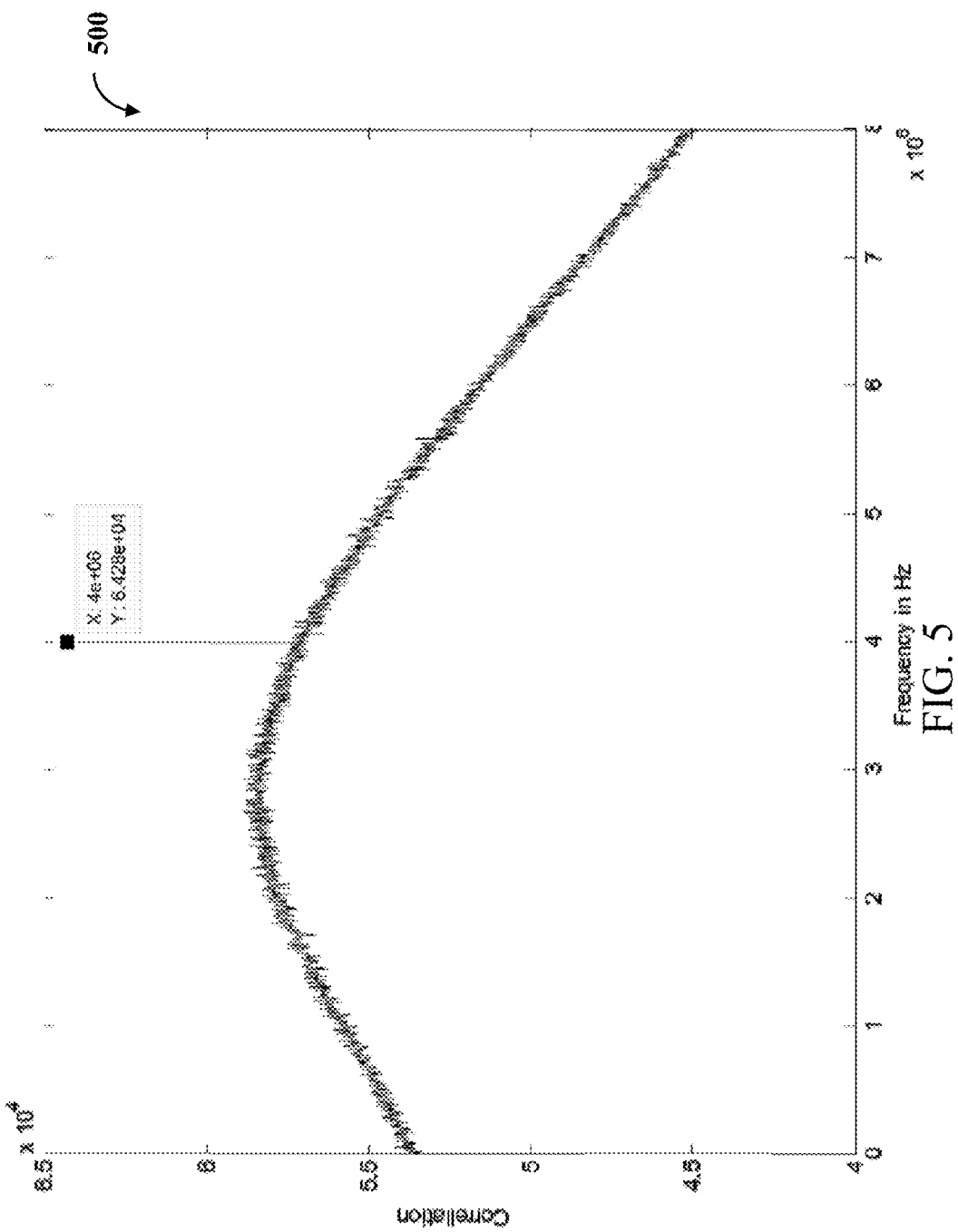
FIG. 5 illustrates one embodiment of a graph.
Figure 6:
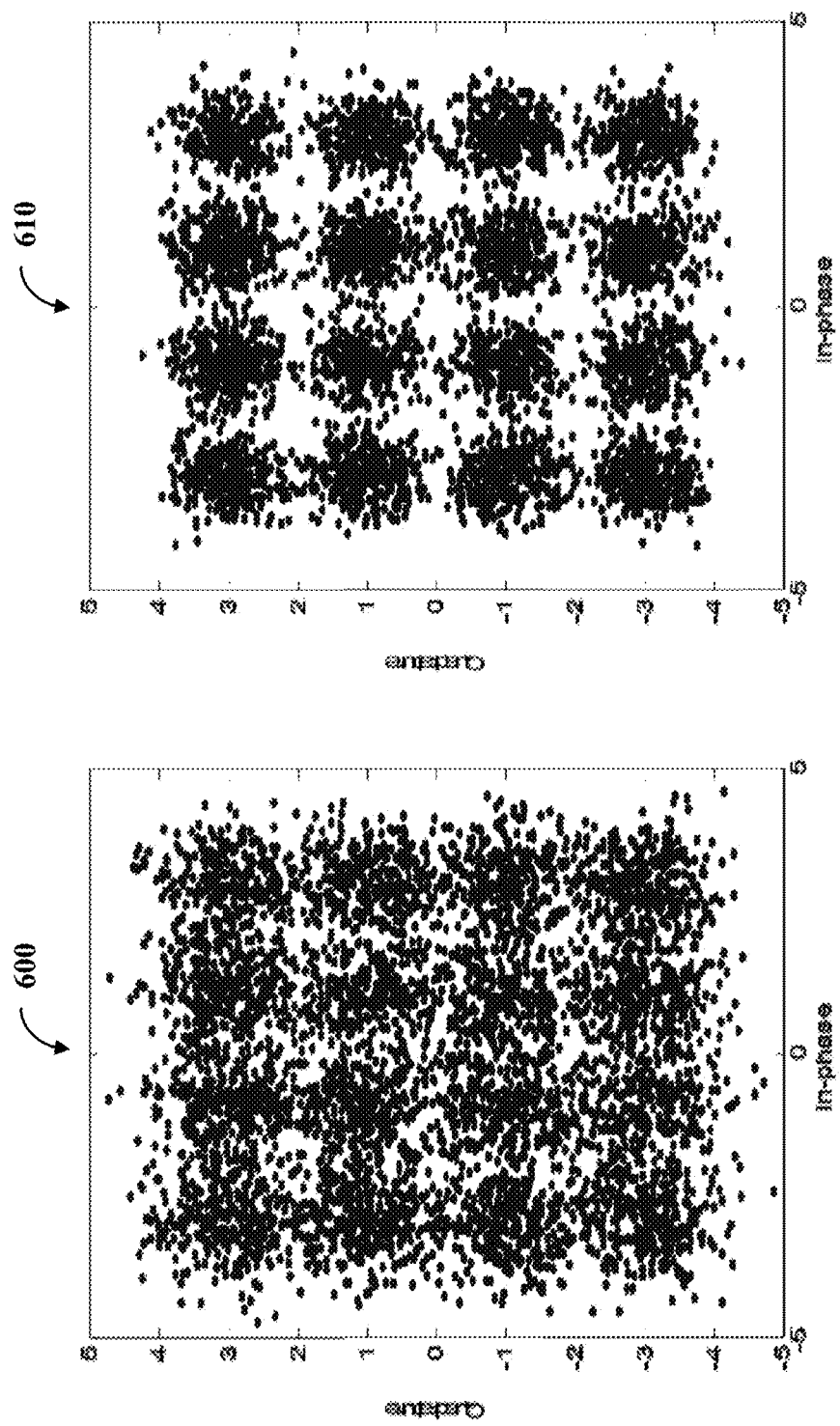
FIG. 6 illustrates one embodiment of two graphs.

FIG. 4 illustrates one embodiment of a graph 400, FIG. 5 illustrates one embodiment of a graph 500, and FIG. 6 illustrates one embodiment of two graphs 600 and 610. RTO and RFO estimations can be quite effective. A quadrature amplitude modulation (QAM) 16 signal can be generated with 5,000 symbols, which are random integers processed by a square-root raised cosine filter with a roll-off factor of 0.35 and SNR=3 dB. The symbol can be sampled at 40 MHz with 4 samples per symbol. $\Delta\omega_2/2\pi=4$ Hz, $\Delta\tau_2=50$ µsec, $\Delta a_2=1$, and $\Delta\beta_2=0$. The RTO is estimated using (12) and the result is shown in the graph 400. The RFO is estimated using (20) as shown in the graph 500. RSO is not considered with regard to the graphs 400 and 500.

After estimating offsets, multiple signals can be combined coherently to improve the signal quality. Graphs 600 and 610 show the demodulated symbols of $r_1$ and $r^c$ (fused $r_1$ and $r_2$), respectively. Graph 610 has a much lower bit-error rate (BER) than graph 600. Typically, the more sensors used, the lower the BER will be. The demodulated symbols are not required in post-synchronization.

An advantage to using asynchronous and heterogenous sensors is to leverage the low-cost or existing communication devices and network without significant investment. Nonlinear offsets RTO and RFO can be estimated independently with the fast search, and the linear offsets RMO and RPO can be calculated directly after RTO and RFO estimation. The offset estimation does not require knowledge of the baseband signal information. That is, the symbol rate, carrier frequency, carrier phase, pulse-shaping filter, over-sampling rate, etc. are not known. The estimation is robust in the low SNR. The asynchronous signal copies with RMO, RTO, RFO, RPO, RSFO, and RSTO can be combined coherently after post-synchronization. The properly combined signal has been demonstrated to achieve the better performance in signal sensing and modulation classification.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

A plurality of sensors can be deployed in an environment. Different signals can be present in the environment and there can be a desire to identify one of those signals even if a network of the desired signal is unknown (and as such a demodulation scheme of the desired signal is not known). The plurality of sensors can sense weak editions of the desired signal (signal of interest) and transfer those signals to a master sensor or to a separate location, such as a fusion center. The weak editions may be asynchronous due to the editions being captured at different times, etc. At the master sensor or separate location, the weak editions can be synchronized together and then fused together into a strong signal. From the strong signal, a demodulation scheme can be determined and the signal can be demodulated.

Figure 7:
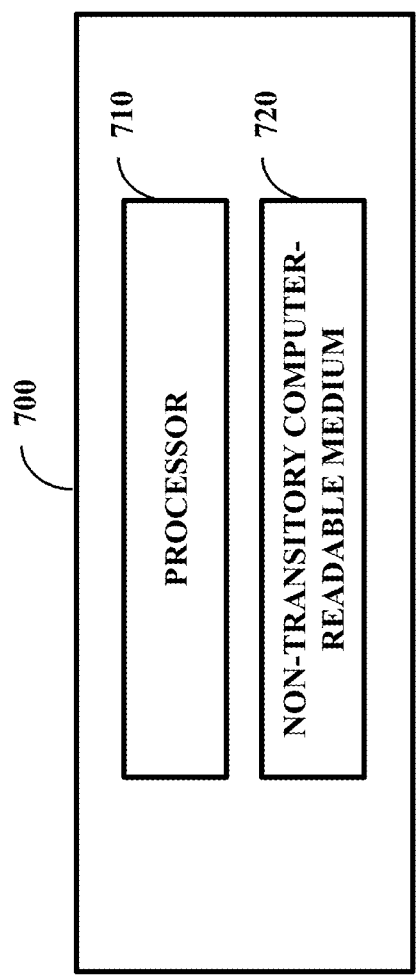
FIG. 7 illustrates one embodiment of a system comprising a processor and a non-transitory computer-readable medium.

FIG. 7 illustrates one embodiment of a system 700 comprising a processor 710 and a non-transitory computer-readable medium 720. In one embodiment, the non-transitory computer-readable medium 720 is communicatively coupled to the processor 710 and stores components (e.g., components disclosed herein) executable by the processor 710 to facilitate operation of those components. In one embodiment, a method can comprise executing instructions from the non-transitory computer readable medium 720. In one embodiment, the non-transitory computer-readable medium 720 is configured to store computer-executable instructions that when executed by the processor 710, cause the processor 710 to perform a method disclosed herein.

Figure 8:
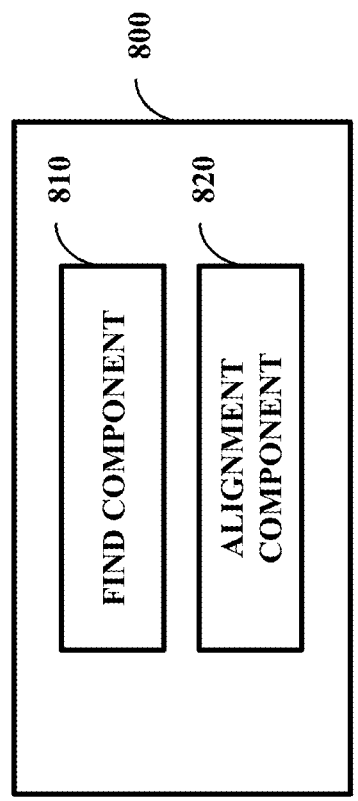
FIG. 8 illustrates one embodiment of a system comprising a find component and an alignment component.

FIG. 8 illustrates one embodiment of a system 800 comprising a find component 810 and an alignment component 820. The find component 810 is configured to find an alignment point between a first signal edition of a signal and a second signal edition of the signal. The first signal edition can be different from the second signal edition (e.g., editions that include the signal plus random noise). A first sensor can collect the first signal edition while second sensor can collect the second signal edition, where the first sensor and second sensor are different sensors. The alignment component 820 is configured to use the alignment point to align the first signal edition and the second signal edition, where the alignment point is a point of greatest alignment between the first signal edition and the second signal edition.

In one example, referring to the graph 500 of FIG. 5, when two signal editions are compared with one another, a specific frequency can exist where the editions greatly match one another. The point (4e+06, 6.428e+04) can be found (e.g., identified) as the alignment point by the find component. The alignment component 820 can find a matching frequency to the point and align the first signal edition with the second signal edition.

In one embodiment, the first sensor is part of a first network, the second sensor is part of a second network, and the first network and second network are different networks. While aspects disclosed herein may discuss two sensors with two signal editions, it is to be appreciated by one of ordinary skill in the art that more than two sensors that collect more than two signal editions can be used. For example, four sensors can be used to capture four signal editions. In one embodiment, the first sensor and the second sensor are part of the same network while a third sensor is part of a different network, where the first sensor, second sensor, and third sensor obtain three different signal editions.

In one embodiment, a first Fourier transform is applied to the first signal edition of the signal to produce a first transform result and a second Fourier transform (e.g., different from the first Fourier transform) is applied to the second signal edition of the signal to produce a second transform result. The first transform result and second transform result are used by the find component 810 to find the alignment point.

Figure 9:
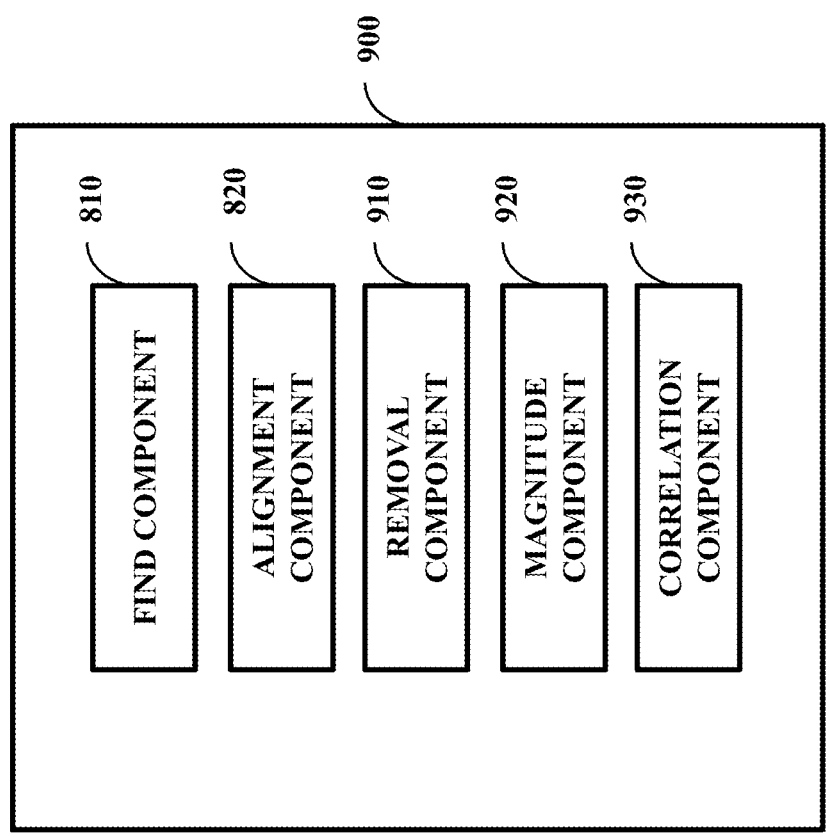
FIG. 9 illustrates one embodiment of a system comprising the find component, the alignment component, a removal component, a magnitude component, and a correlation component.

FIG. 9 illustrates one embodiment of a system 900 comprising the find component 810, the alignment component 820, a removal component 910, a magnitude component 920, and a correlation component 930. The removal component 910 is configured to remove a phase from the first signal edition and is configured to remove a phase from the second signal edition. The magnitude component 920 is configured to determine a magnitude of the first signal edition after the phase is removed and configured to determine a magnitude of the second signal edition after the phase is removed. The correlation component 930 is configured to make a correlation between the first signal edition and the second signal edition through use of the magnitude of the first signal edition and the magnitude of the second signal edition, where the correlation is used by the find component 810 to find the alignment point.

Figure 10:
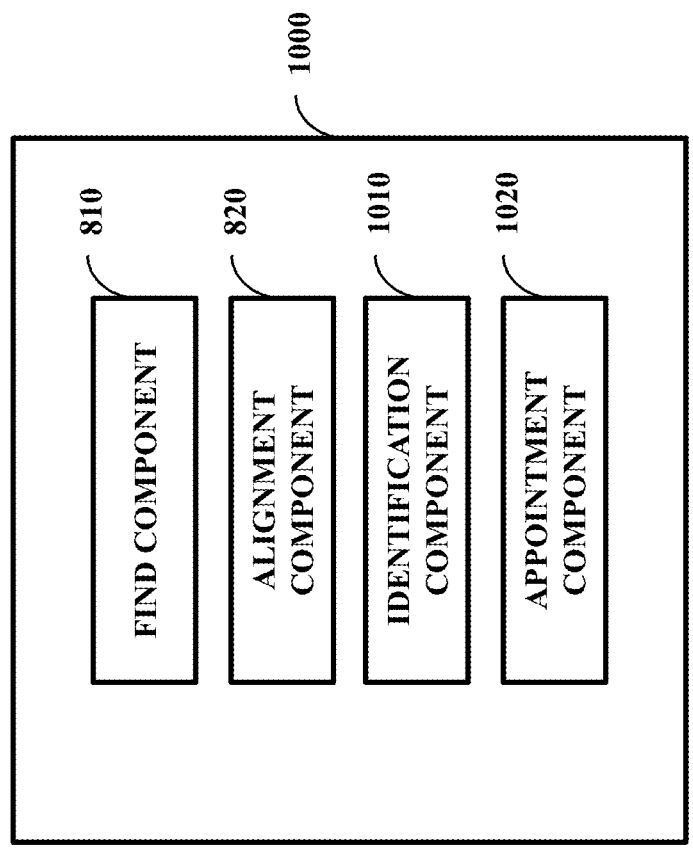
FIG. 10 illustrates one embodiment of a system comprising the find component, the alignment component, an identification component, and an appointment component.

FIG. 10 illustrates one embodiment of a system 1000 comprising the find component 810, the alignment component 820, an identification component 1010, and an appointment component 1020. The identification component 1010 is configured to coarsely estimate a noise level of the first signal edition and configured to identify a noise level of the second signal edition. The appointment component 1020 is configured to make an appointment of a base signal edition from one of the first signal edition or the second signal edition. The find component 810 is configured to find an alignment point between the base signal edition and a third signal edition (e.g., collected by a third sensor different from the first sensor as well as the second sensor), where the third signal edition is different from the first signal edition as well as the second signal edition.

Figure 11:
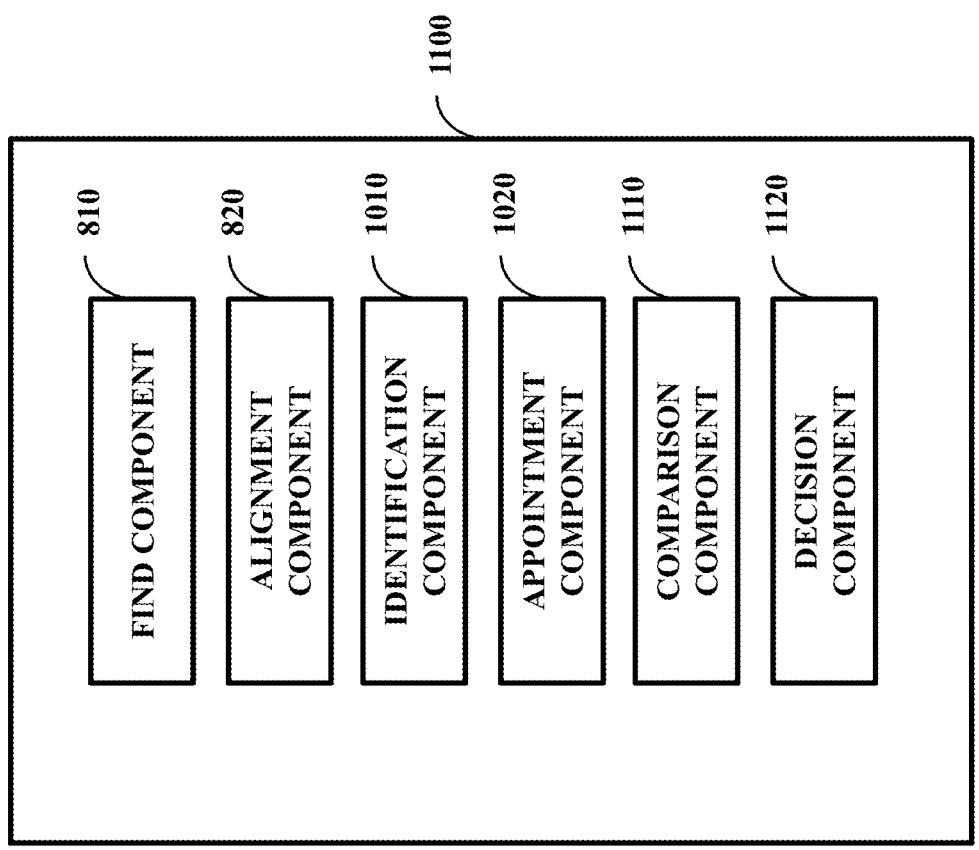
FIG. 11 illustrates one embodiment of a system comprising the find component, the alignment component, the identification component, the appointment component, a comparison component, and a decision component.

FIG. 11 illustrates one embodiment of a system 1100 comprising the find component 810, the alignment component 820, the identification component 1010, the appointment component 1020, a comparison component 1110, and a decision component 1120. The comparison component 1110 is configured to make a comparison of the noise level of the base signal edition against a noise level of the third signal edition, where the identification component 1010 is configured to coarsely estimate the noise level of the third signal edition. The decision component 1120 is configured to make a determination on if the base signal edition should be replaced with the third signal edition based, at least in part, on a result of the comparison, where the base signal edition is replaced with the third signal edition in response to the determination being positive.

A plurality of signal editions can be collected from a plurality of different sensors. An edition can be compared against another edition. An edition with the lower noise of the two can be designated a base edition and as such, the edition with more noise can be synchronized to the edition with less noise. The base edition can then be used to synchronize a third edition collected at the same time, fourth edition, etc. If an edition later in time has less noise than the current base edition, then the editions can be synchronized and then the base edition can be replaced with the lower noise edition and be used in further synchronization. In short, an edition with lowest noise can be used as the base signal edition for use in synchronization of other signal editions.

Figure 12:
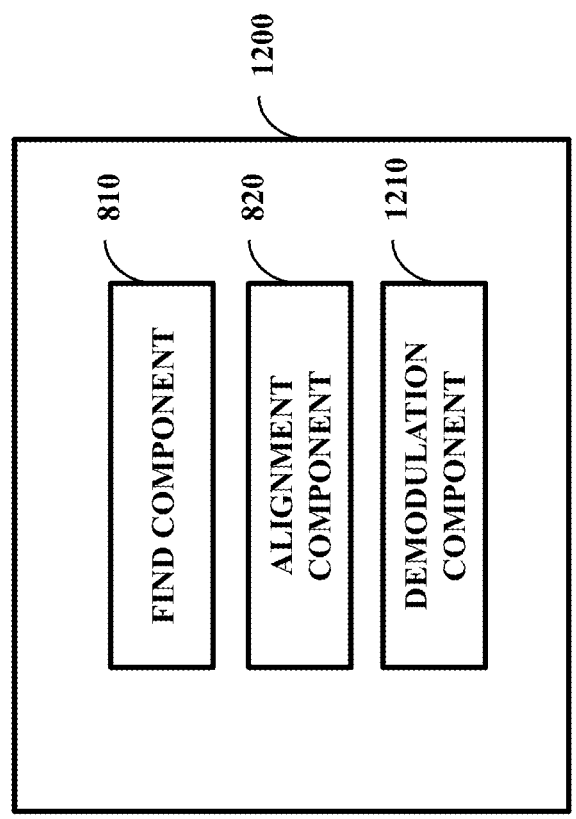
FIG. 12 illustrates one embodiment of a system comprising the find component, the alignment component, and a demodulation component.

FIG. 12 illustrates one embodiment of a system 1200 comprising the find component 810, the alignment component 820, and a demodulation component 1210. The demodulation component 1210 is configured to make a determination on a modulation scheme of the signal based, at least in part, on the first signal edition and the second signal edition after the first signal edition and the second signal edition are aligned by the alignment component 820.

In one embodiment, after the first signal edition and the second signal edition are aligned, a moment calculation can be performed such that the first signal edition is multiplied by the second signal edition and then the product is used in a summation. A result from the moment calculation can be void, due to the noise being uncorrelated or due to its randomness, through the moment calculation. The result can be used to find a similar signal, from a database of known signals, to the signal. The similar signal can have an associated modulation scheme and the demodulation component 1210 can designate the associated modulation scheme as the modulation scheme of the signal.

Figure 13:
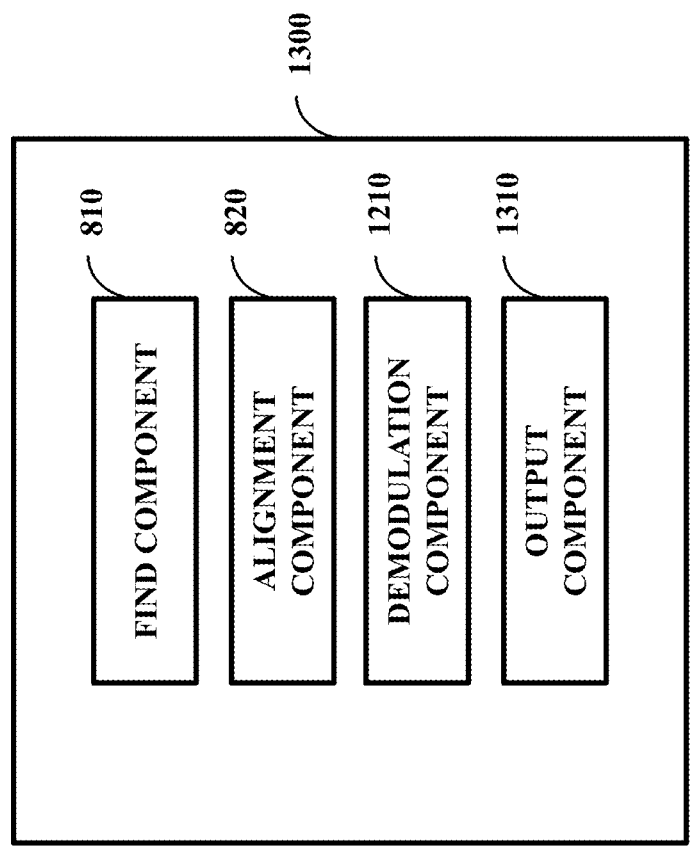
FIG. 13 illustrates one embodiment of a system comprising the find component, the alignment component, the demodulation component, and an output component.

FIG. 13 illustrates one embodiment of a system 1300 comprising the find component 810, the alignment component 820, the demodulation component 1210, and an output component 1310. The output component 1310 is configured to cause the signal to be outputted (e.g., output the signal) after the signal is demodulated through use of the modulation scheme, where the demodulation component 1210 is configured to demodulate the signal in accordance with the modulation scheme.

Figure 14:
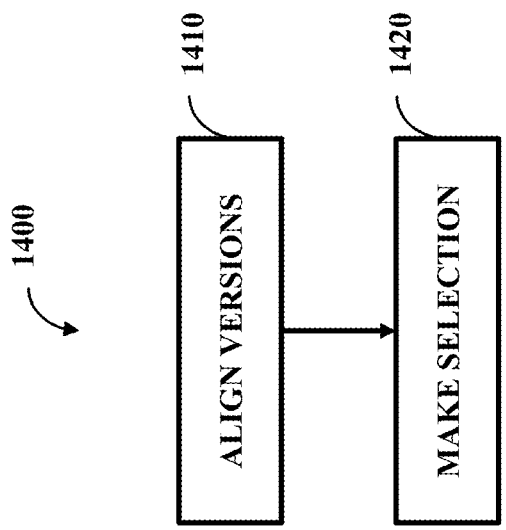
FIG. 14 illustrates one embodiment of a method that comprises aligning versions and making selections.

FIG. 14 illustrates one embodiment of a method 1400 that comprises aligning versions and making selections. At 1410, there is aligning a first signal edition of a signal with a second signal edition of the signal, where the first signal edition is different from the second signal edition, where a first sensor collects the first signal edition, where a second sensor collects the second signal edition, where the first sensor and second sensor are different sensors. At 1420, there is making a selection of a demodulation scheme for the signal, where the selection is based, at least in part, on mathematical analysis of the first signal edition and the second signal edition when aligned.

In one embodiment, the method 1400 (and other methods disclosed herein) can function as instructions that are executed from the non-transitory computer-readable medium 720 of FIG. 7. In one embodiment, the first sensor is part of a first network, where the second sensor is part of a second network, and where the first network and second network are different networks. In addition, the network of the signal may be unknown and/or the signal may be of the first network or second network.

In one embodiment, a first Fourier transform is applied to the first signal edition of the signal to produce a first transform result and a second Fourier transform (e.g., the same as or different from the first Fourier transform) is applied to the second signal edition of the signal to produce a second transform result. The first transform result and second transform result are used to align the first signal edition and the second signal edition.

In one embodiment, the first sensor is part of a first personal electronic device with a primary purpose other than functioning as a sensor of the first signal edition (e.g., a walkie-talkie radio) and where the second sensor is part of a second personal electronic device with a primary purpose other than functioning as a sensor of the second signal edition (e.g., a tunable software-defined radio). Signal editions can be gathered from various devices, even without an owner of the device knowing or the device itself knowing. Various devices can be leveraged as sensors (along with primary purpose sensors) to obtain signal editions.

Figure 15:
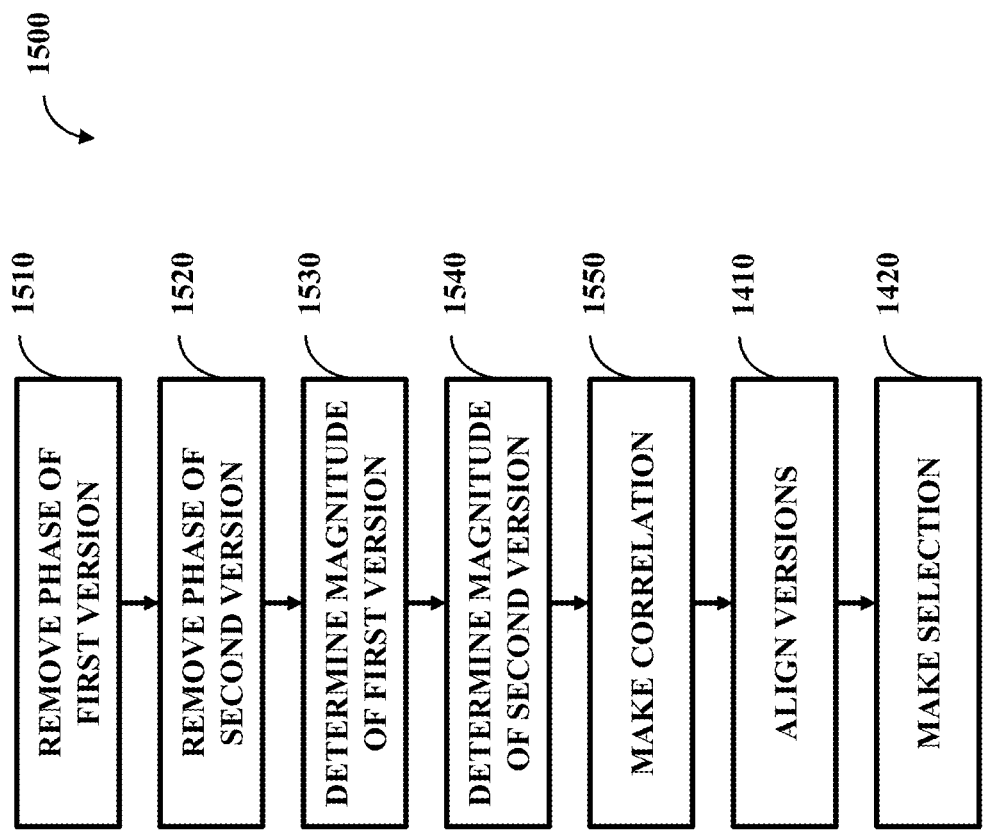
FIG. 15 illustrates one embodiment of a method comprising various actions.

FIG. 15 illustrates one embodiment of a method 1500 comprising various actions in addition to actions 1410 and 1420. At 1510, there is removing a phase from the first signal edition before alignment while at 1520, there is removing a phase from the second signal edition before alignment. At 1530, determining a magnitude of the first signal edition after the phase is removed from the first signal edition occurs, while at 1540, determining a magnitude of the second signal edition after the phase is removed from the second signal edition occurs. At 1550, there is making a correlation between the first signal edition and the second signal edition through use of the magnitude of the first signal edition and the magnitude of the second signal edition, where the correlation is used to align the first signal edition with the second signal edition. For example, the correlation can be finding the point (5e–05) in graph 400 of FIG. 4 or finding the point (4e+06) in graph 500 of FIG. 5.

Figure 16:
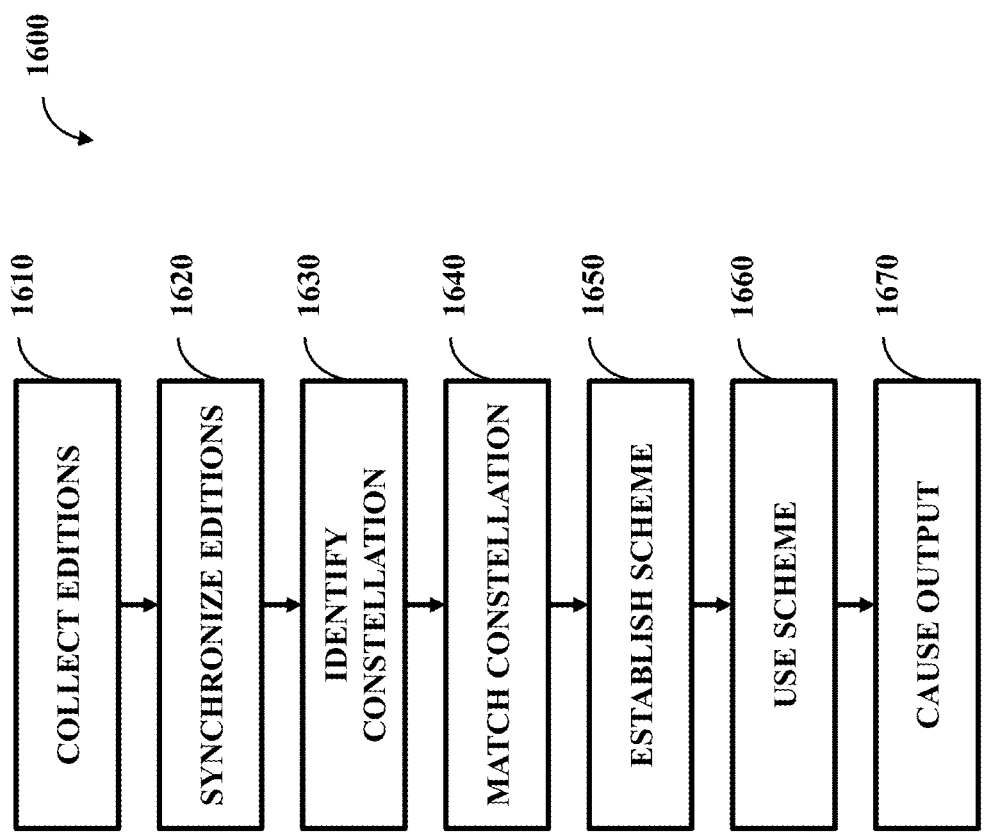
FIG. 16 illustrates one embodiment of a method with various actions.

FIG. 16 illustrates one embodiment of a method 1600 with various actions. At 1610, there is collecting a first signal edition of a signal from a first sensor and collecting a second signal edition of the signal from a second sensor, where the first signal edition and the second signal edition are not synchronized with one another and a network of the signal is unknown. While shown as one action, various actions disclosed herein as one action can be performed in separate actions (e.g., separately collecting the first signal edition and the second signal edition) and actions disclosed as multiple actions can be performed as one action.

At 1620, there is synchronizing (e.g., post-synchronizing) the first signal edition with the second signal edition. In one embodiment, synchronizing the first signal edition with the second signal edition is performed such that synchronization compensates for relative time offset, relative frequency offset, relative phase offset, relative sampling frequency offset, and relative sampling time offset when applicable.

At 1630, identifying a constellation of the signal through use of the first signal edition and the second signal edition occurs. At 1640, there is matching the constellation of the signal with a constellation of a known signal. At 1650, establishing a modulation scheme associated with the known signal takes place. At 1660, there is using the modulation scheme associated with the known signal to demodulate the signal. At 1670, there is causing the signal to be outputted after being demodulated.

In one embodiment, the first signal edition collected from the first sensor is raw data and the second signal edition collected from the second sensor is raw data. Raw data can include a signal edition that has not been pre-processed by a sensor or a signal edition that has experienced relatively little processing by a sensor (e.g., before being forwarded to a fusion center).

Figure 17:
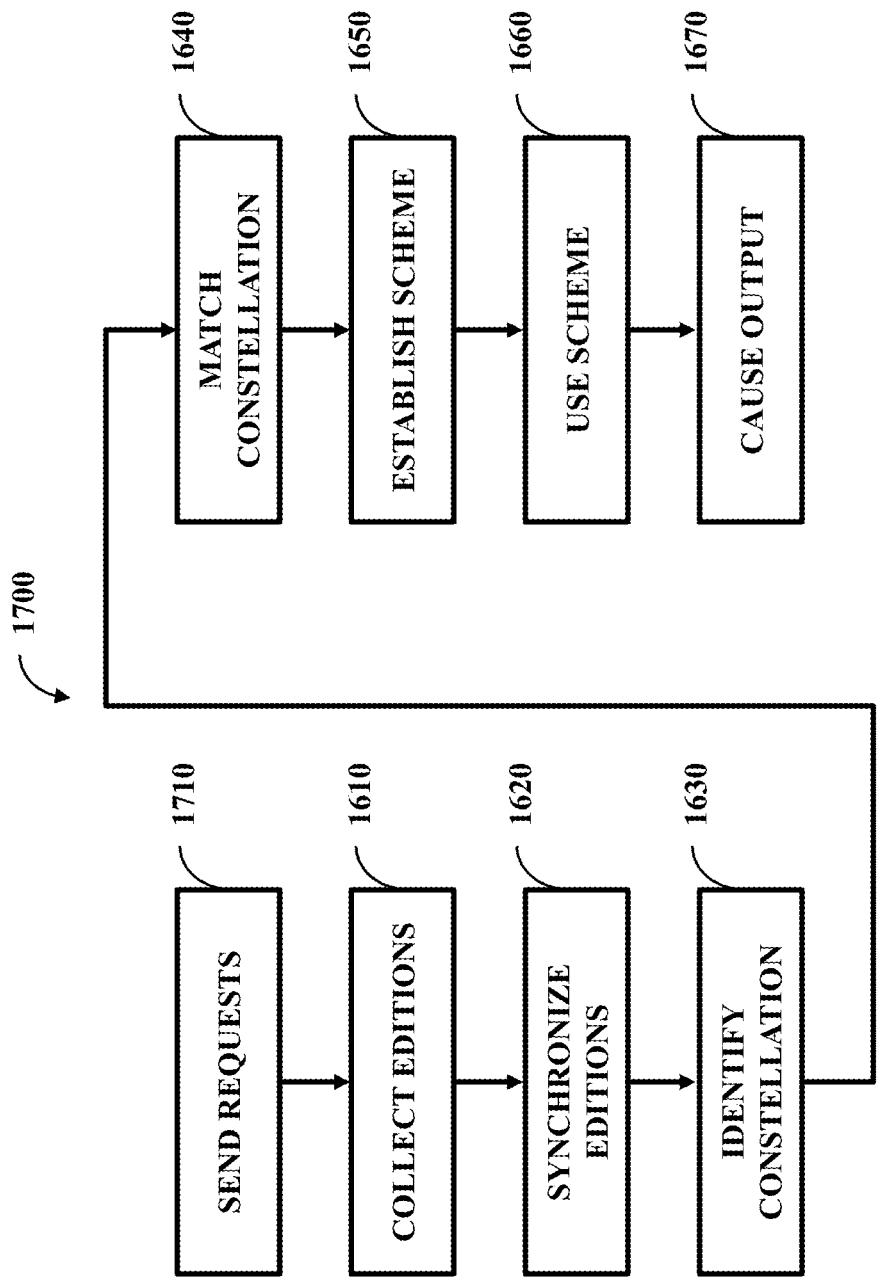
FIG. 17 illustrates one embodiment of a method that comprises request sending along with other actions.

FIG. 17 illustrates one embodiment of a method 1700 that comprises request sending, at 1710, along with other actions 1610-1670. At 1710 there is sending a first request to the first sensor for the first signal edition, where the first signal edition is collected after the first request is sent. Further, at 1710, there is sending a second request to the second sensor for the second signal edition, where the second signal edition is collected after the second request is sent. In one embodiment, the first sensor and the second sensor are dumb sensors that forward the first signal edition that is collected and the second signal edition that is collected, respectively, and that do not make a local decision regarding synchronization of the first signal edition and second signal edition, respectively.

In one embodiment, a single request can be sent out as the first request and the second request. This single request can request for sensors receiving the single request to transfer and/or capture editions of the signal. The single request can be such that a receiving sensor (e.g., authorized receiving sensor) transfers an edition of the signal or that the single request is sent to specific sensors.

Figure 18:
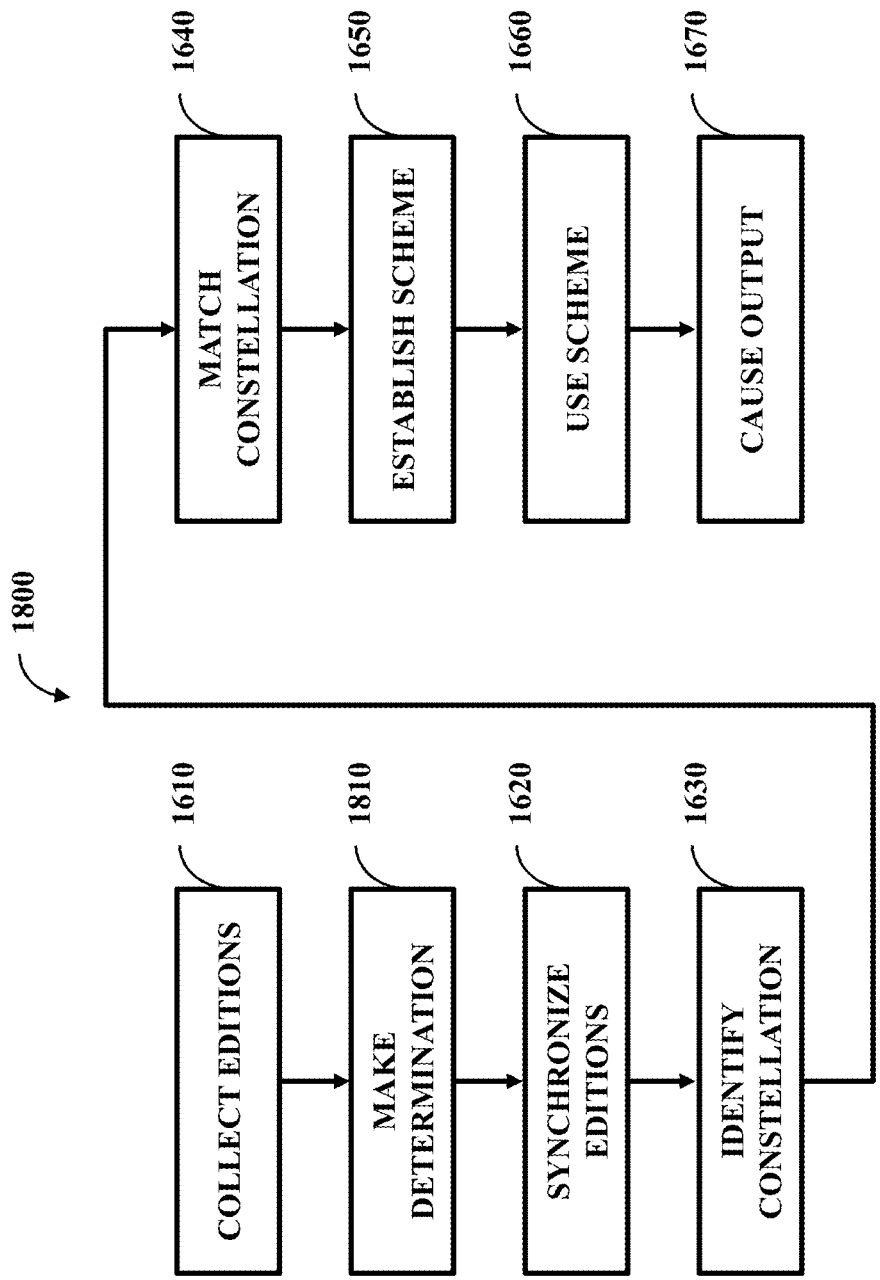
FIG. 18 illustrates one embodiment of a method that includes determination making as well as other actions.

FIG. 18 illustrates one embodiment of a method 1800 that includes determination making, at 1810, as well as other actions 1610-1670. At 1610 there is collecting a third signal edition from a third sensor, where the third signal edition is not synchronized with the first signal edition, where the third signal edition is not synchronized with the second signal edition, where the third signal is not on a network of the first signal, and where the third signal is not on a network of the second signal. In one embodiment, the third sensor can be of the same network as the first sensor and/or the second sensor (e.g., first sensor and second sensor are of the same network). At 1810, there is making a determination if the third signal should be excluded. At 1620, synchronizing the first signal edition, the second signal edition, and the third signal edition occurs when the determination is to not exclude the third signal edition. At 1630, identifying the constellation of the signal through use of the first signal edition, the second signal edition, and the third signal edition occurs.

Figure 19:
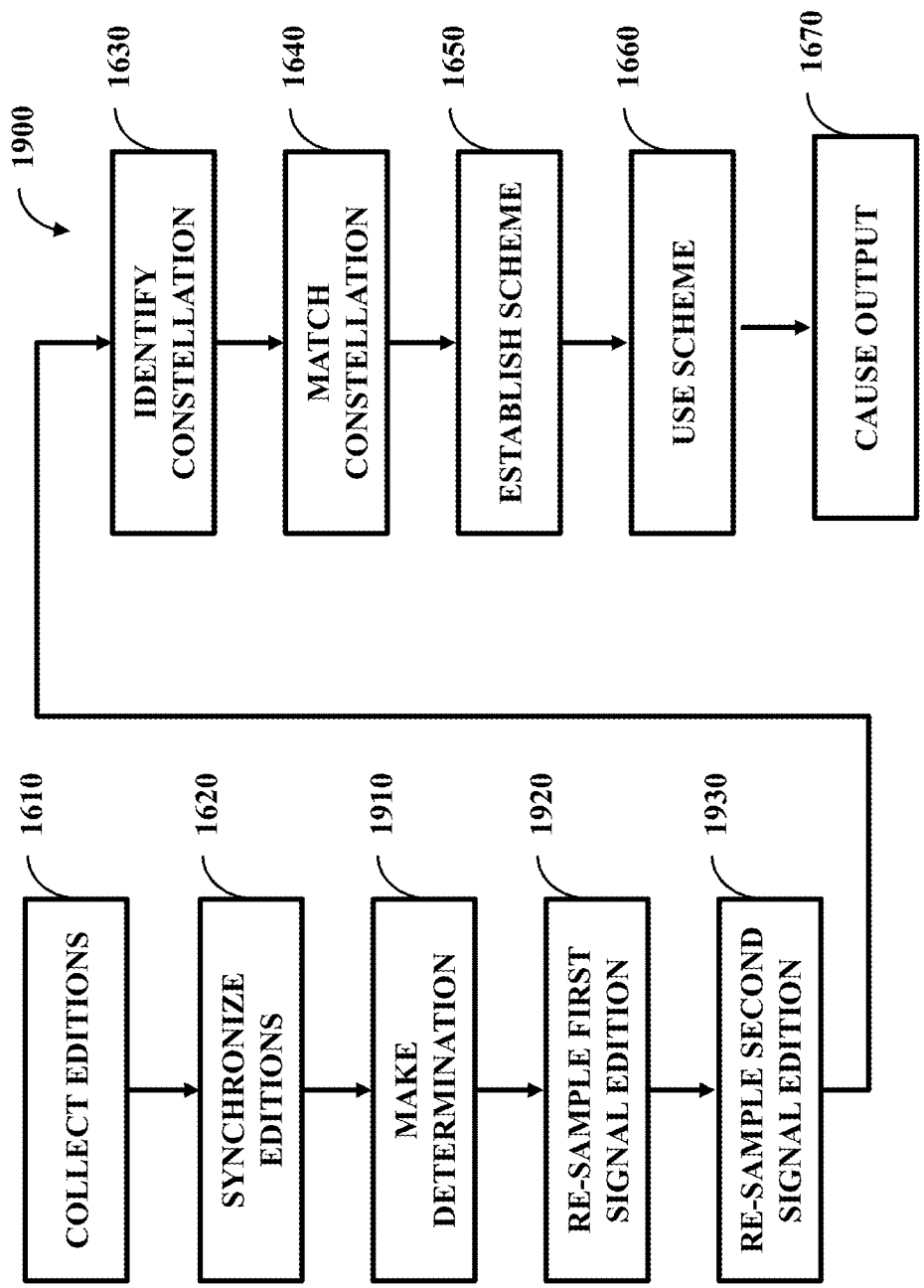
FIG. 19 illustrates one embodiment of a method that includes determination making, edition re-sampling, and other actions.

FIG. 19 illustrates one embodiment of a method 1900 that includes determination making, edition re-sampling, and other actions 1610-1670. At 1910, there is making a determination if a sampling clock associated with the first sensor is the same clock or is synchronized with a sampling clock associated with the second sensor. At 1920, there is re-sampling the first signal edition in response to the determination being negative after synchronizing the first signal edition with the second signal edition. At 1930, re-sampling the second signal edition occurs in response to the determination being negative after synchronizing the first signal edition with the second signal edition, where synchronizing the first signal edition with the second signal edition comprises synchronizing the first signal edition after being re-sampled with the second signal edition after being re-sampled.

What is claimed is:

1. A system comprising:
   a processor; and
   a non-transitory computer-readable medium communicatively coupled to the processor that stores components executable by the processor to facilitate operation of components, the components comprising:
   a find component configured to find an alignment point between a first signal edition of a signal and a second signal edition of the signal;
   an alignment component configured to use the alignment point to align the first signal edition and the second signal edition;
   an identification component configured to identify a noise level of the first signal edition and configured to identify a noise level of the second signal edition;
   an appointment component configured to make an appointment of a base signal edition from one of the first signal edition or the second signal edition,
   where the first signal edition is different from the second signal edition,
   where a first sensor collects the first signal edition,
   where a second sensor collects the second signal edition,
   where the first sensor and second sensor are different sensors,
   where the alignment point is a point of greatest alignment between the first signal edition and the second signal edition,
   where the find component is configured to find an alignment point between the base signal edition and a third signal edition,
   where a third sensor collects the third signal edition, where the third signal edition is different from the first signal edition,
   where the third signal edition is different from the second signal edition,
   where the third sensor is a different sensor from the first sensor, and
   where the third sensor is a different sensor from the second sensor.

2. The system of claim 1, where the first sensor is part of a first network, where the second sensor is part of a second network, and where the first network and second network are different networks.

3. The system of claim 1, the components comprising:
   a removal component configured to remove a phase from the first signal edition and configured to remove a phase from the second signal edition;
   a magnitude component configured to determine a magnitude of the first signal edition after the phase is removed and configured to determine a magnitude of the second signal edition after the phase is removed; and
   a correlation component configured to make a correlation between the first signal edition and the second signal edition through use of the magnitude of the first signal edition and the magnitude of the second signal edition, where the correlation is used by the find component to find the alignment point.

4. The system of claim 1, where a first Fourier transform is applied to the first signal edition of the signal to produce a first transform result, where a second Fourier transform is applied to the second signal edition of the signal to produce a second transform result, and where the first transform result and second transform result are used by the find component to find the alignment point.

5. The system of claim 1, the components comprising:
   a comparison component configured to make a comparison of a noise level of the base signal edition against a noise level of the third signal edition; and
   a decision component configured to make a determination on if the base signal edition should be replaced with the third signal edition based, at least in part, on a result of the comparison,
   where the identification component is configured to coarsely estimate the noise level of the third signal edition and
   where the base signal edition is replaced with the third signal edition in response to the determination being positive.

6. The system of claim 1, the components comprising:
   a demodulation component configured to make a determination on a modulation scheme of the signal based, at least in part, on the first signal edition and the second signal edition after the first signal edition and the second signal edition are aligned by the alignment component.

7. The system of claim 6, the components comprising:
   an output component configured to cause the signal to be outputted after the signal is demodulated through use of the modulation scheme, where the demodulation component is configured to demodulate the signal in accordance with the modulation scheme.

8. The system of claim 1,
where the first sensor and the second sensor are dumb sensors.

9. The system of claim 1,
where the appointment component is configured to make the appointment of the base signal by selection of a signal with a lowest noise between the first signal edition and the second signal edition.

10. The system of claim 1,
where the appointment component is configured to replace use the third signal edition as the base signal after the first signal edition or the second signal edition is appointed as the base signal.

11. The non-transitory computer-readable medium of claim 8, where the first sensor and the second sensor are dumb sensors that forward the first signal edition that is collected and the second signal edition that is collected, respectively, and that do not make a local decision regarding synchronization of the first signal edition and second signal edition respectively.

12. A non-transitory computer-readable medium configured to store computer-executable instructions that when executed by a processor cause the processor to perform a method, the method comprising:
collecting a first signal edition of a signal from a first sensor;
collecting a second signal edition of the signal from a second sensor, where the first signal edition and the second signal edition are not synchronized with one another and a network of the signal is unknown;
collecting a third signal edition from a third sensor, where the third signal edition is not synchronized with the first signal edition, where the third signal edition is not synchronized with the second signal edition, where the third sensor not on a network of the first sensor, and where the third sensor is not on a network of the second sensor;
making a determination if the third signal should be excluded;
if the determination is to exclude the third signal edition:
synchronizing the first signal edition with the second signal edition; and
identifying a constellation of the signal through use of the first signal edition and the second signal edition; and
if the determination is not to exclude the third signal edition:
synchronizing the first signal edition, the second signal edition, and the third signal edition;
identifying the constellation of the signal through use of the first signal edition, the second signal edition, and the third signal edition;
matching the constellation of the signal with a constellation of a known signal;
establishing a modulation scheme associated with the known signal;
using the modulation scheme associated with the known signal to demodulate the signal; and
causing the signal to be outputted after being demodulated.

13. The non-transitory computer-readable medium of claim 12, comprising:
sending a first request to the first sensor for the first signal edition, where the first signal edition is collected after the first request is sent; and
sending a second request to the second sensor for the second signal edition, where the second signal edition is collected after the second request is sent.

14. The non-transitory computer-readable medium of claim 13, where the first sensor and the second sensor are dumb sensors that forward the first signal edition that is collected and the second signal edition that is collected, respectively, and that do not make a local decision regarding synchronization of the first signal edition and second signal edition respectively.

15. The non-transitory computer-readable medium of claim 12, where the first signal edition collected from the first sensor is raw data and where the second signal edition collected from the second sensor is raw data.

16. The non-transitory computer-readable medium of claim 15, where synchronizing the first signal edition with the second signal edition is performed such that synchronization compensates for relative time offset, relative frequency offset, relative phase offset, relative sampling frequency offset, and relative sampling time offset when applicable.

17. A non-transitory computer-readable medium non-transitory computer-readable medium configured to store computer-executable instructions that when executed by a processor cause the processor to perform a method, the method comprising:
collecting a first signal edition of a signal from a first sensor;
collecting a second signal edition of the signal from a second sensor, where the first signal edition and the second signal edition are not synchronized with one another and a network of the signal is unknown;
making a determination if a sampling clock associated with the first sensor is synchronized with a sampling clock associated with the second sensor;
re-sampling the first signal edition in response to the determination being negative after synchronizing the first signal edition with the second signal edition;
re-sampling the second signal edition in response to the determination being negative after synchronizing the first signal edition with the second signal edition;
synchronizing the first signal edition after being re-sampled with the second signal edition after being re-sampled;
identifying a constellation of the signal through use of the first signal edition and the second signal edition;
matching the constellation of the signal with a constellation of a known signal;
establishing a modulation scheme associated with the known signal;
using the modulation scheme associated with the known signal to demodulate the signal; and
causing the signal to be outputted after being demodulated.

18. The method of claim 17,
where identifying a constellation of the signal through use of the first signal edition and the second signal edition comprises identifying a constellation of the signal through use of the first signal edition and the second signal edition after synchronizing the first signal edition after being re-sampled with the second signal edition after being re-sampled and
where synchronizing the first signal edition after being re-sampled with the second signal edition after being re-sampled is performed such that synchronization compensates for relative time offset, relative frequency offset, relative phase offset, relative sampling frequency offset, relative sampling time offset when applicable, or a combination thereof.

19. The non-transitory computer-readable medium of claim 17, comprising:
sending a first request to the first sensor for the first signal edition, where the first signal edition is collected after the first request is sent; and
sending a second request to the second sensor for the second signal edition, where the second signal edition is collected after the second request is sent.

20. The non-transitory computer-readable medium of claim 17, where the first signal edition collected from the first sensor is raw data and where the second signal edition collected from the second sensor is raw data.

* * * * *